US 6,721,263 B1

(12) United States Patent
Ota et al.

(10) Patent No.: US 6,721,263 B1
(45) Date of Patent: Apr. 13, 2004

(54) DISK HOLDING MECHANISM AND DISK HOLDING MECHANISM CLAMPER

(75) Inventors: Hidehiko Ota, Ehime (JP); Yoshinori Takada, Ehime (JP); Hideaki Yamataka, Ehime (JP); Seigo Matsumoto, Ehime (JP); Tsuyoshi Hashida, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 134 days.

(21) Appl. No.: 09/807,872

(22) PCT Filed: Aug. 17, 2000

(86) PCT No.: PCT/JP00/05493

§ 371 (c)(1),
(2), (4) Date: Jul. 9, 2001

(87) PCT Pub. No.: WO01/15157

PCT Pub. Date: Mar. 1, 2001

(30) Foreign Application Priority Data

Aug. 20, 1999 (JP) .......................... 11-233826

(51) Int. Cl.⁷ .......................................... G11B 23/00
(52) U.S. Cl. .................................................. 369/270
(58) Field of Search .............................. 369/270, 271, 369/264, 285, 290, 291; 360/99.08

(56) References Cited

U.S. PATENT DOCUMENTS 5,457,676 A * 10/1995 Park ........................... 369/270
5,467,338 A * 11/1995 Song .......................... 369/270
6,373,813 B2 * 4/2002 Huang et al. ................ 369/270
6,438,095 B1 * 8/2002 Haga et al. .................. 369/270
6,535,476 B1 * 3/2003 Haga .......................... 369/270

FOREIGN PATENT DOCUMENTS

| JP | 60-175350 | 11/1985 |
| JP | 64-42544 | 3/1989 |
| JP | 64-60848 | 3/1989 |
| JP | 1-144260 | 6/1989 |
| JP | 1-182959 | 7/1989 |
| JP | 1-182960 | 7/1989 |
| JP | 2-50852 | 4/1990 |
| JP | 9-17081 | 1/1997 |

* cited by examiner

*Primary Examiner*—Allen Cao
(74) *Attorney, Agent, or Firm*—McDermott, Will & Emery

(57) ABSTRACT

A disk retaining mechanism that realizes a reduction of its thickness while maintaining a clamping force and a centering accuracy of the clamper, with a structure, in which: a guide (11) is disposed in a manner to closely confront a clamper retaining member (9); a clamper unit retaining portion of the clamper retaining member (9) has such a shape that a part of which an entire circumference is cut out; a clamper unit for depressing a disk (13) is provided with a disk holder (3) having an engagement projection (M); and an annular engagement groove (F) formed in a turntable (7) for loading the disk (13) is arranged below an upper end of a main shaft (8) that transfers rotation of a motor unit (10).

20 Claims, 10 Drawing Sheets

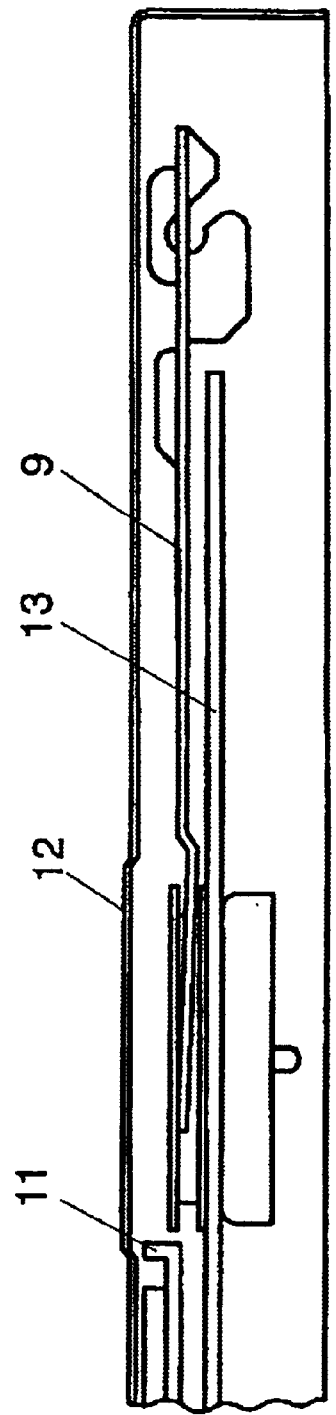
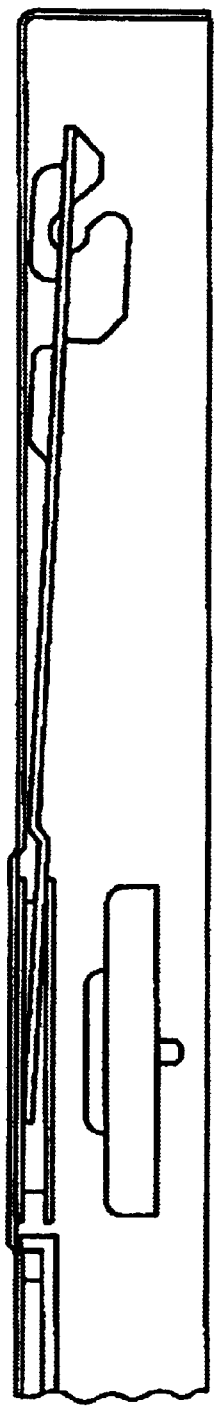
FIG. 1A
FIG. 1B

DISK HOLDING MECHANISM AND DISK HOLDING MECHANISM CLAMPER

FIELD OF THE INVENTION

The present invention relates to a disk retaining mechanism in a disk drive of a type that retains a disk with a turntable and a clamper.

BACKGROUND OF THE INVENTION

With the progress of compact-type personal computers and notebook-type personal computers, there is now a demand that disk drives installed in them need to be extremely thin. On the other hand, it is indispensable to increase speed of the devices and to improve recording and reproducing performance.

For this reason, the current disk drives generally employ a magnet-chucking method, in which a turntable for loading a disk and a clamper for retaining the disk in position are attracted by an attractive force of a magnet.

With regard to a centering mechanism of the clamper, it is now common to use a mechanism, in which one of the turntable and the clamper is provided with an engagement hole having a tapered surface, and the other with an engagement projection, so as to center the clamper with respect to the turntable by engaging them.

A disk retaining mechanism of the prior art will be described hereinafter using the accompanying drawings.

FIGS. 8A and 8B are side views depicting an essential part of the disk retaining mechanism of the prior art. FIG. 8A shows a state wherein a disk is clamped, and FIG. 8B a state of back-out. FIG. 9 is a sectional view of an essential part of the disk retaining mechanism of the prior art. FIG. 10 is a sectional view depicting a main part of the disk retaining mechanism of the prior art in a state of the centering engagement.

As shown in FIG. 9, a clamper unit comprises a disk holder 51, another disk holder 53 and a magnet 52 of an annular shape. The disk holder 53 has an engagement projection (m) formed in the center part of it. The clamper unit is retained by a clamper retaining member 59. The disk holders 51 and 53 are bonded together by adhesion or the like.

A turntable unit comprises a turntable 57 and a turntable yoke 56 of an annular shape. An engagement hole (f) is formed in the center of the turntable 57. The turntable unit rotates as it is connected to a motor unit 60 with a main shaft 58.

The clamper retaining member 59 is formed in such a shape that it retains an entire external periphery of the disk holder 51, as shown in FIG. 8A and FIG. 8B. The clamper unit is therefore retained reliably to prevent the clamper unit, including the disk holder 51, from becoming disengaged from the clamper retaining member 59. However, since the clamper unit is lifted obliquely by the clamper retaining member 59 when it is in the back-out position, as shown in FIG. 8B, it is indispensable for the clamper unit to maintain a back-out height (ht), thereby making it difficult to reduce thickness.

When a disk 63 is inserted, an electric signal activates a driving mechanism of the clamper retaining member 59, so as to thrust the disk holders 51 and 53 toward the turntable 57. As the disk holders 51 and 53 come close to the turntable 57, the engagement hole (f) in the turntable unit side and the engagement projection (m) on the clamper unit side come into contact, and subsequently engage with each other to achieve the centering. In addition, a magnetic circuit is formed between the magnet 52 and the turntable yoke 56, when the disk comes off the disk holder 51 due to an impact and the like, and damages the disk retaining mechanism.

However, it requires the magnet 52 to have the outer diameter larger than the inner diameter of the magnet retaining portion of the disk holder 51, thereby resulting in the magnet 52 of large size, and an increase in cost. In addition, the outer periphery of the magnet 52 is larger than that of the turntable yoke 56. Therefore, an effective magnetic circuit is not established in the peripheral area of the magnet yoke 52. Furthermore, there was also a problem that requires a large force to release an irregular clamping if the clamping occurs erroneously with no disk inserted therein, since the magnet 52 and the turntable yoke 56 make a close contact directly.

DISCLOSURE OF THE INVENTION

The present invention is intended to solve the above-described problem, and it aims at providing a disk retaining mechanism as well as a clamper for the disk retaining mechanism that achieve a reduction in thickness of a disk drive while maintaining good clamping force and centering accuracy at all times.

To solve the problem, the disk retaining mechanism of this invention comprises: a turntable unit for loading a disk; a motor unit for transferring rotation to the turntable unit; a clamper unit for holding the disk with the turntable unit; a clamper unit retaining member having a clamper unit retaining portion of a shape that a part of which an entire circumference is cut out, for retaining the clamper unit; and a guide unit disposed in a position closely confronting the clamper unit retaining member.

Further, a disk retaining mechanism of this invention comprises: a clamper unit having a depressing member for depressing the disk and a centering member disposed in generally a center of the disk depressing member; a turntable having a groove for engaging with the holders 51 and 53, and the turntable 57 come close to each other. As a result, the disk 63 is held between the disk holder 51 and the turntable 57 by an attractive force of the magnetism.

In this instance, the disk holder 51 and the disk holder 53 of the clamper unit are bonded into one-piece structure by adhesion, or the like, as shown in FIG. 9. This is effective in view of reducing the manufacturing cost. However, it is difficult to reduce the thickness, which is considered to be important, because it requires vertically a large space. Furthermore, because the engagement projection (m) is required to protrude downwardly below a bottom surface of the disk holder 51 due to its structure, it is necessary to take even a larger back-out height (ht).

Moreover, an engagement length (h3) is necessary for the main shaft 58 with respect to the turntable 57, as shown in FIG. 10, in order to ensure a certain coupling strength or greater in the engagement between the turntable 57 and the main shaft 58. Another engagement length (h1) is also indispensable between the engagement projection (m) and the engagement hole (f) to ensure the reliable centering. Furthermore, a clearance (h2) is also essential to gain a positive clamping force, even when there is dispersion in thickness of the disk 63 to be inserted. In short, a height of (h1+h2+h3) is at least necessary for the centering portion. For this reason, the vertical space became large, and it was difficult to reduce the thickness, an important matter. Moreover, the engagement projection (m) and the engagement hole (f) are generally equal in diameter to the main shaft 58 having a small diameter. Since the centering was carried out with the small diameter, it was difficult for the clamper to achieve a high centering accuracy.

As shown in FIG. 9, an outer diameter of the magnet 52 is designed to be larger than an inner diameter of a magnet retaining portion of the disk holder 51. This helps the attractive force produced by the magnet 52 to effect directly on the disk holder 51, so as to make possible a positive depression of the disk. It also prevents such an incident as the magnet 52 centering member; and a motor unit having a main shaft connected with the turntable, wherein a magnet is disposed on one of the disk depressing member and the turntable, and a ferromagnetic body on the other one in a position facing the magnet, so that the disk depressing member is attracted to the turntable unit by an attractive force of the magnet.

A clamper for the disk retaining mechanism of the present invention comprises: a turntable unit for loading a disk; a motor unit for transferring rotation to the turntable unit; and a clamper unit for holding the disk with the turntable unit, and the clamper unit comprises: a disk depressing member for depressing the disk; a magnet disposed within the disk depressing member; and a centering member disposed in generally a center of the disk depressing member, wherein the disk depressing member is attracted to the turntable unit by an attractive force of the magnet, thereby thrusting the centering member toward the turntable side.

BRIEF DESCRIPTION OF THE DRAWINGS

FIGS. 1A and B are side views depicting an essential part of a disk retaining mechanism of the present invention;

THE BEST MODE FOR CARRYING OUT THE INVENTION

With reference to the drawings, exemplary embodiments of the present invention will be described hereinafter.

First Exemplary Embodiment

FIGS. 1A and B are side views of an essential part of a disk retaining mechanism of the present invention. FIG. 1A shows a state in which a disk 13 is clamped, and FIG. 1B shows a back-out state.

Figure 2A:
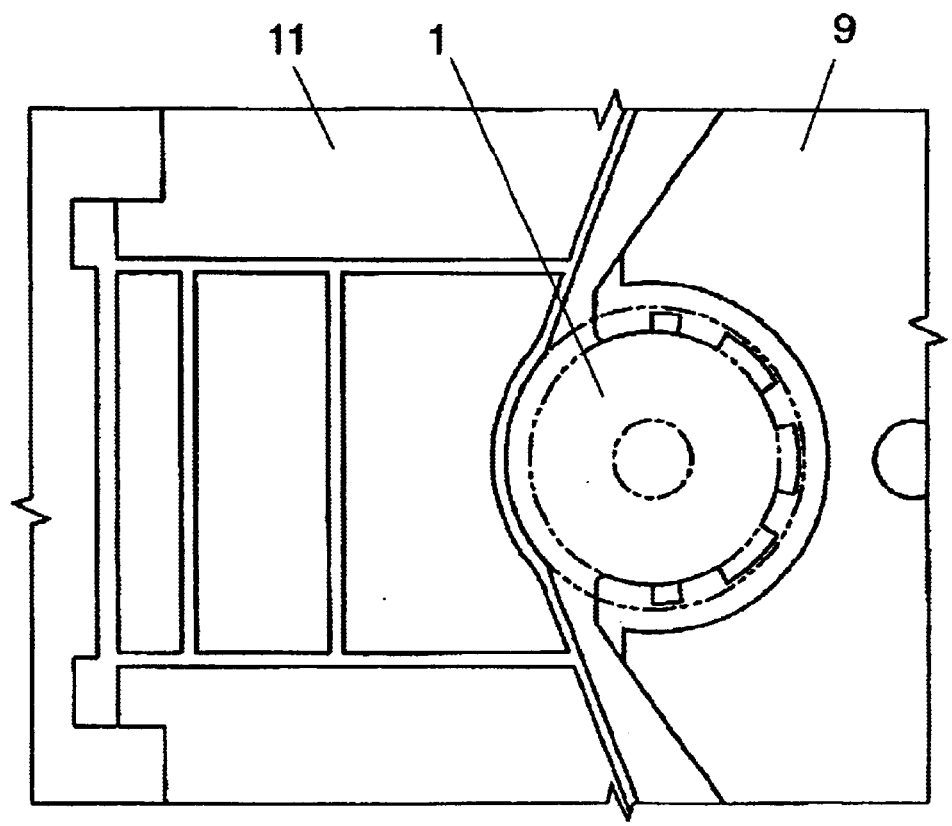
FIGS. 2A and B are illustrations depicting a of a clamper unit of the present invention.
Figure 2B:
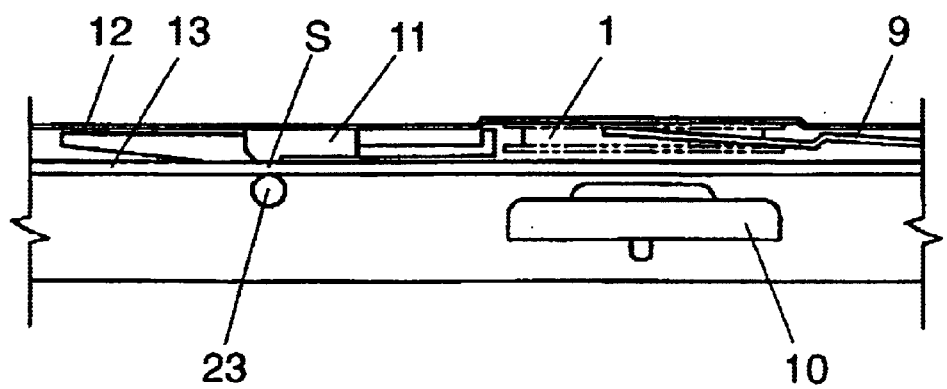

FIGS. 2A and B are illustrations depicting a part of a clamper unit of the disk retaining mechanism of the present invention. FIG. 2A is a partial view as observed from upper side of the clamper unit, and FIG. 2B is another partial view observed from side of the clamper unit. FIG. 2A depicts a view in which a cover 12 shown in FIG. 2B is removed. Further, FIG. 2B depicts a view in which a disk 13 is being inserted.

Figure 3:
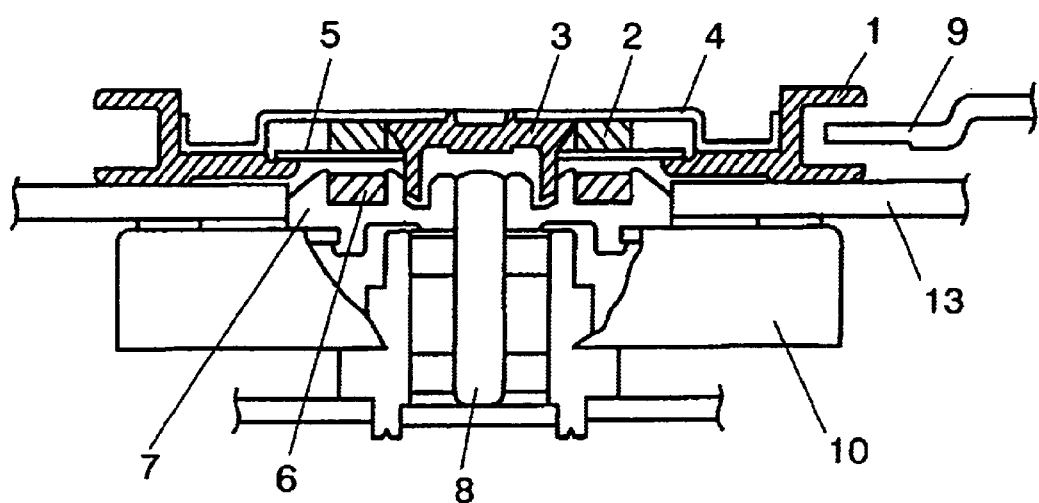
FIG. 3 is a sectional view depicting an essential part of the disk retaining mechanism of the present invention.

FIG. 3 is a sectional view of a main part of the clamper unit in the disk retaining mechanism of this invention, showing a state, in which the disk is clamped.

The clamper unit of this exemplary embodiment comprises a disk holder 1, a magnet 2, a disk holder 3, a magnet cover 5, and a magnet yoke 4, as shown in FIG. 3.

The magnet 2 is annularly shaped, and secured by adhesive material or the like within the magnet yoke 4 in a concentrical manner with the disk holder 3. Here, the magnet 2 shall not necessarily be annular in shape. Instead, plural segments of magnet, for instance, may be disposed radially around the disk holder 3.

With reference to FIG. 1 and FIG. 3, a method of retaining the clamper unit of this invention will now be described. The disk holder 1, on which the magnet yoke 4, the magnet 2, the disk holder 3 and the magnet cover 5 are mounted, is retained by a clamper retaining member 9 with a given clearance both vertically and laterally around it, so as to be rotatable and vertically slidable.

The disk holder 1 is retained by the clamper retaining member 9, as shown in FIG. 1. A portion of the clamper retaining member 9, with which to retain the disk holder 1 is formed into such a shape that parts of its entire circumference are cut out as shown in FIG. 2A. This portion of the clamper retaining member 9 for retaining the clamper unit is semicircularly shaped, so as to make the clamper unit extremely easy to assemble, thereby realizing a cost reduction. A guide 11 is provided in a position confronting the clamper retaining member 9, in close vicinity of the disk holder 1. The guide 11 guides the disk holder 1, when the disk holder 1 makes a reciprocating motion between a back-out position and a disk clamping position. At the same time, the guide 11 serves to prevent the disk holder 1 from coming off the clamper retaining member 9. A cover 12 is placed above the disk holder 1 to cover the entirety. A major movable member comprised of the disk holder 1 and the clamper retaining member 9, when constructed as described above, becomes free from any part projecting upward. In addition, since the disk holder 1 in its back-out position takes a posture that is generally in parallel with the cover 12, as shown in FIG. 1B, a required height in the back-out position can be reduced, thereby achieving a reduction in thickness of the disk retaining mechanism.

Figure 4:
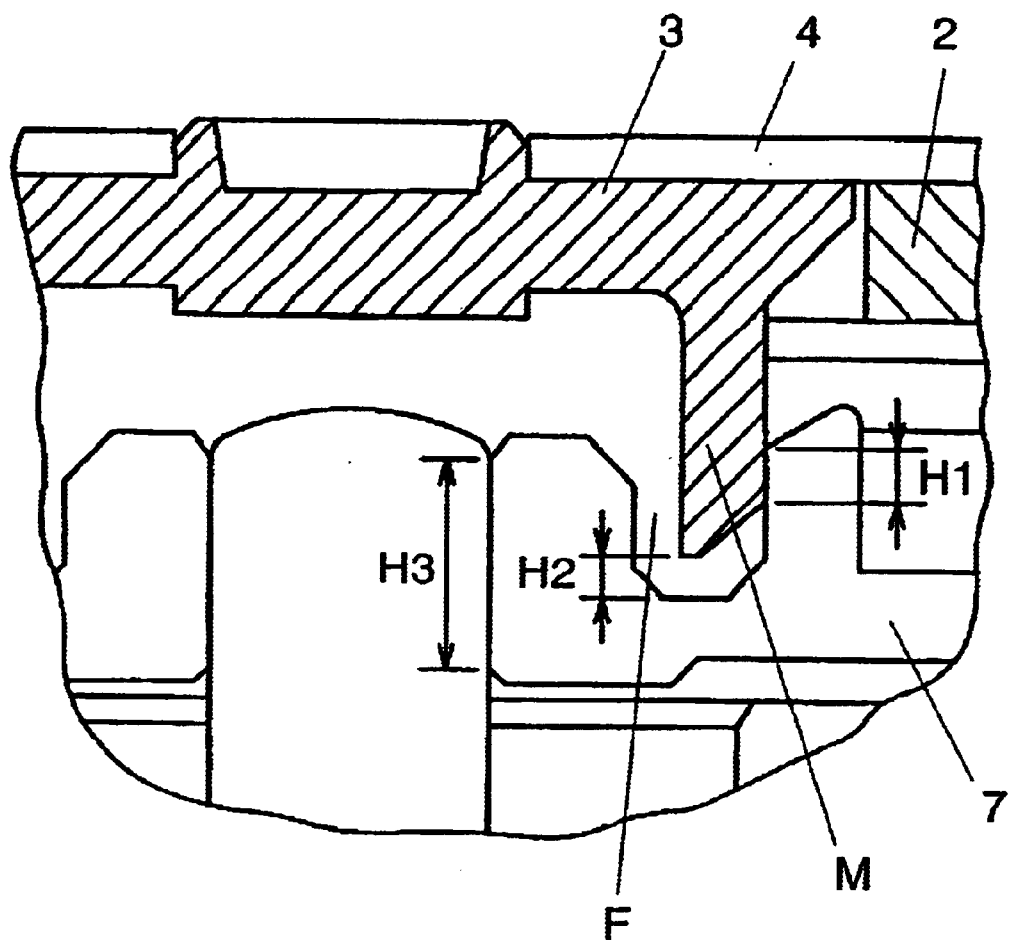
FIG. 4 is a sectional view depicting a main part of a centering engagement portion in the disk retaining mechanism of the present invention.

FIG. 4 is a sectional view of a main part of the centering engagement portion in this invention.

As shown in FIG. 3 and FIG. 4, the centering engagement portion in this invention consists of an engagement projection (M) of the disk holder 3, serving as a centering member, and an engagement groove (F) of the turntable 7. The turntable 7 is formed of non-magnetic material of high rigidity such as polycarbonate resin or aluminum. The disk holder 3 provided with the engagement projection (M) is secured by adhesion, or the like, to a center area of the magnet yoke 4 which is a ferromagnetic body of discoidal shape. A leading end of the engagement projection (M) is tapered. A magnet cover 5 made of non-magnetic material such as acrylic resin or weak magnetic material is placed under magnet 2. The magnet yoke 4 is mounted in a concentrical manner within the disk holder 1. However, the disk holder 3 and the magnet yoke 4 may be formed integrally.

As shown in FIG. 3 and FIG. 4, a main shaft 8 of a motor unit 10 is fitted in a center part of the turntable 7 for transferring rotation of the motor unit 10. The turntable 7 has an annular engagement groove (F) arranged along its outer periphery in a manner to be concentrical with the main shaft 8. A part of the engagement groove (F) is tapered. The engagement groove (F) is formed into an annular shape or at regular intervals along one circumference. The engagement groove (F) may be substituted by engagement holes formed at regular intervals along the same one circumference. The turntable yoke 6 constructed of an annularly shaped ferromagnetic body is secured concentrically to the turntable 7 by adhesive or, the like. Here, an outer diameter of the turntable 7 that engages with the disk 13 is designed to match with a standardized size of a center hole of the disk 13, so that the disk 13 is engaged and centered correctly.

The magnet 2 disposed concentrically to the disk holder 3, which serves as the centering member of the clamper unit, and the turntable yoke 6 of ferromagnetic material on the turntable 7 are arranged in such positions that confront with respect to each other, so as to form a magnetic circuit when they come close to each other.

Referring now to FIG. 2B and FIG. 3, operation will be described when the disk 13 is inserted. An electric signal starts a roller 23 to rotate when the disk 13 is inserted up to a point where a leading end of the disk 13 reaches a point (S) shows in FIG. 2B. The disk 13 comes into contact with both of the guide 11 and the roller 23, and it is transferred by their frictional force toward a predetermined position where a center of the disk 13 is generally in alignment with a center of the turntable 7. In this invention, a disk tray is not used to carry the disk 13 when the disk 13 is inserted. Therefore, the disk retaining mechanism in its entirety can be reduced in thickness. When the disk 13 reaches a predetermined position, an electric signal activates a driving mechanism for the clamper retaining member 9, so as to thrust the entire disk holder 1 toward the turntable 7. The disk holder 1 moves vertically downward, as guided by the guide 11. When the engagement projection (M) of the disk holder 3 meets the engagement groove (F) of the turntable 7, their tapered portions contact, and the centering begins. The disk holder 1 is thrust further toward the turntable 7 to advance the engagement accurately by an attractive force of the magnetic circuit formed between the magnet 2 and the turntable yoke 6. The disk 13 is thus centered, and it is subsequently fixed in position between the turntable 7 and the disk holder 1. In this invention, the centering is achieved by engaging an outer periphery of the engagement projection (M) of the disk holder 3 with an outer periphery of the engagement groove (F) of the turntable 7. This can therefore increase an engaging diameter for the centering, thereby attaining a precise clamper centering with small deviation. In addition, the disk 13 is centered with the turntable 7 formed of rigid material. This helps carry out the precise centering without being influenced by torsion that otherwise results if the turntable 7 is made of elastic material.

With reference to FIG. 4, described hereinafter pertains to an engagement length required for the centering engagement portion. An engagement length (H1) of the engagement projection (M) of the disk holder 3 with the engagement groove (F) of the turntable 7 is set to be at least 0.6 mm or greater. A clearance (H2) of at least 0.5 mm or more is set between the leading end of the engagement projection (M and a bottom of the engagement groove (F). The disk holder 1 and the turntable 7 are held in parallel by the magnetic force of the magnetic circuit established between the magnet 2 and the turntable yoke 6. Therefore, any disk can be held and retained properly, so long as the inserted disk has a thickness between 1.5 mm (the maximum standardized value) and a minimum value of 1.1 mm (the minimum standardized value).

An engagement length (H3) of the main shaft 8, which transfers rotation of the motor 10 to the turntable 7, to the turntable 7 needs to be a predetermined dimension or longer in order that the turntable 7 rotates about the main shaft 8 without wobbling, and without resulting in such incidents as slipping out and loosening due to inertial force or impulsive force during use. In this invention, the engagement groove (F) in the turntable 7 is arranged to be lower than an upper end of the main shaft 8. This structure makes a setting possible to satisfy H3≧H1+H2, and a required up-and-down stroke is H3 in this instance. This therefore realizes a reduction in thickness of the disk retaining mechanism while maintaining the necessary engagement length. By virtue of this invention, in which the engagement groove (F) in the turntable 7 is arranged below the upper end of the main shaft 8, a substantial reduction is attained in rotational disorder caused by a slight inclination of the disk holder 1 when it retains the disk, thereby realizing reliable retention of the disk and recording/reproducing operation.

Functions of the magnet cover 5 will now be described by referring to FIG. 3. The magnet cover 5 in a sheet form consisting of non-magnetic material such as acrylic resin and the like or weak magnetic material is disposed on one side of the magnet 2 facing the turntable 7, and secured to the magnet 2 by adhesion or the like. Alternatively, the magnet cover 5 may be fixed to the disk holder 3. Or, the structure may be such that the magnet cover 5 is fixed to the disk holder 1, with a clearance provided between the magnet cover 5 and the disk holder 3, so as to make the disk holder 3 vertically slidable.

Since the magnet 2 is retained by the magnet cover 5, the magnet 2 can be sized generally equal in outer diameter to the turntable yoke 6. Magnetic force of the magnet 2 can thus be used efficiently, so as to realize a downsizing and cost reduction of the magnet 2. Since the placement of magnet cover 5 provides a space between the magnet 2 and the turntable yoke 6 even when the clamping operation is done accidentally without the disk 13 inserted in place, the erroneous clamping can be released only with a small force. In addition, the magnet cover 5 can avoid such an incident that damages the disk retaining mechanism, even if the magnet 2 falls off by an impact and so forth.

Figure 5:
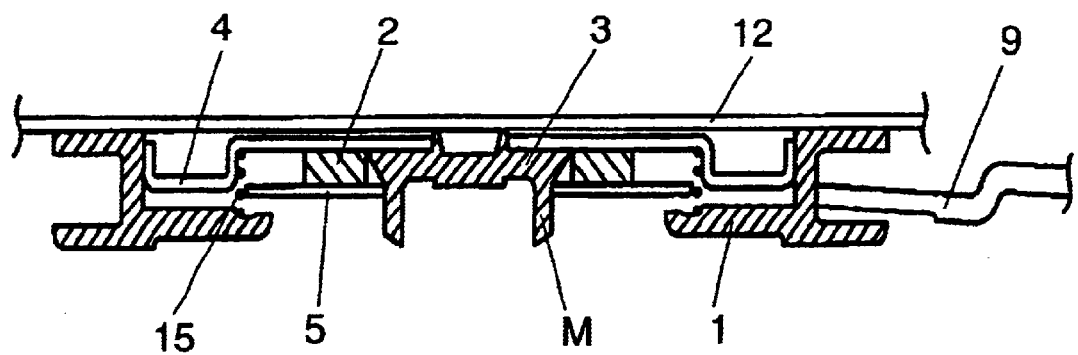
FIG. 5 is an expository illustration showing the clamper unit of the present invention in its back-out position.

FIG. 5 is a schematic illustration of the clamper unit of this invention when it is in the back-out position. The magnet yoke 4 is disposed concentrically within the disk holder 1 in a vertically slidable manner with a predetermined clearance therewith. A spring 15 defining a resilient member is disposed between the disk holder 1 and the magnet yoke 4. The spring 15 thrusts the magnet yoke 4 upwardly. The clamper unit is covered by the cover 12, of which at least a part is composed of ferromagnetic material. A sum of the attractive force of the magnetic circuit formed between the magnet 2 and a ferromagnetic portion of the cover 12 and the thrusting force produced by the spring 15 is designed to be smaller than the attractive force of the magnetic circuit formed between the magnet 2 and the turntable yoke 6. The springs 15 may be substituted by an elastic material such as rubber, resin, or the like.

With reference to FIG. 5, described now is a function of the clamper unit of this invention when it is in the back-out position. When the entire clamper unit is shifted upward by the clamper retaining member 9, the disk holder 1 comes into contact with the cover 12 and stays generally in parallel to it.

This is made possible because the clamper unit retaining portion of the clamper retaining member 9 is generally semicircular, and there is no projection on its upper side. The disk holder 3 and the magnet yoke 4 are shifted upwardly by the combined force given by the attractive force of the magnetic circuit formed between the magnet 2 and the cover 12 and the thrusting force of the spring 15. It then moves up until it comes into contact with the cover 12. This allows further reduction in thickness of the entire clamper unit. In other words, this structure of the invention can reduce not only a height of the clamper unit itself but also a back-out height necessary for the clamper unit to back out.

When the disk holder 1 is in its active position, the clamper unit retaining member 9 is thrust toward the turntable 7 by the force that thrusts the clamper unit toward the turntable side and the attractive force between magnet 2 and the turntable yoke 6. When the disk holder 1 is in its back-out state, the clamper unit retaining member 9 is thrust toward a side opposite to the turntable 7 by the attractive force of the magnetic circuit formed between the magnet 2 and the ferromagnetic portion of the cover 12 and the thrusting force of the spring 15. Or, an equivalent function can even be provided only with either one of the attractive force between the cover 12 and the magnet 2, or the thrusting force of the spring 15.

FIGS. 6A through D illustrate a disk holder A and a magnet yoke of this invention. With reference to FIG. 3 and FIG. 6, there will be described a relation between a disk depressing member and the centering member of this invention.

Figure 6A:
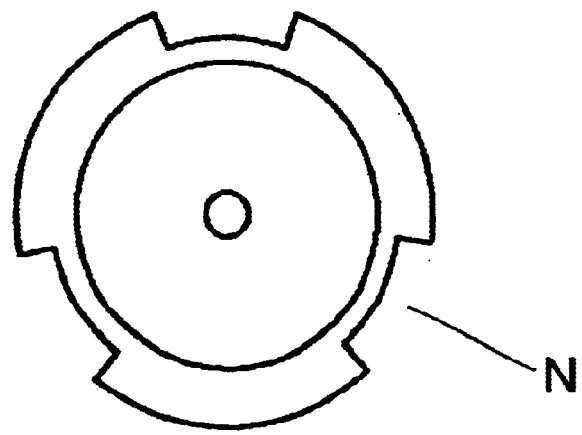
FIGS. 6A through D are illustrations depicting a disk holder and a magnet yoke of the present invention.
Figure 6B:
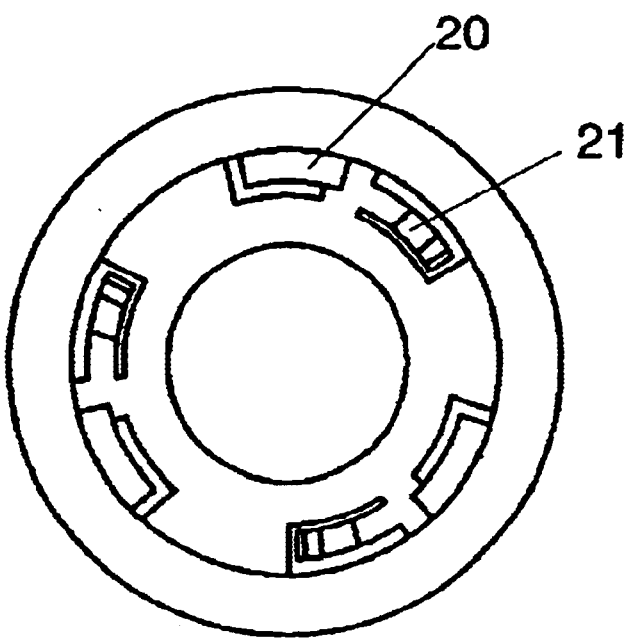
Figure 6C:
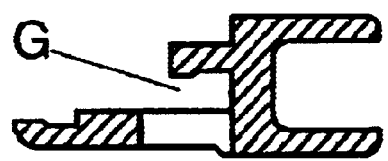
Figure 6D:
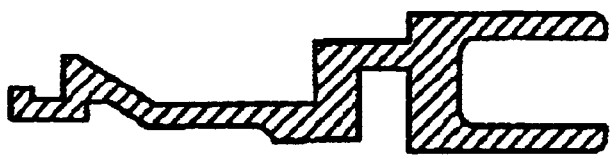

FIG. 6A is a schematic view showing a shape of the magnet yoke 4. FIG. 6B is a schematic view showing a shape of the disk holder 1. FIG. 6C is an enlarged schematic view showing a cross section of a first projection 20 of the disk holder 1. FIG. 6D is an enlarged schematic view showing a cross section of a second projection 21 of the disk holder 1.

The magnet yoke 4 is engaged concentrically in a recess formed in the center area of the disk holder 1. The disk holder 3 and the magnet 2 are secured to the magnet yoke 4 by adhesion or the like. The magnet yoke 4 stays vertically slidable within the disk holder 1. The magnet yoke 4 is formed with notches (N) shown in FIG. 6A in parts of its perimeter. The disk holder 1 is provided with first projections 20 and second projections 21 at positions below the first projections 20 and separated by a predetermined angle. The notches (N) in the magnet yoke 4 and the first projections 20 of the disk holder 1 are formed into similar shapes. The second projections 21 engage with the notches (N) in the magnet yoke 4 when the magnet yoke 4 is inserted. The second projections 21 are so formed that at least a portion of each of them becomes equal height to the notches (N). Grooves (G) are formed under the first projections 20. An inner diameter of the grooves (G) is larger than an outer diameter of the magnet yoke 4. Also, a width of the grooves (G) is wider than a thickness of the magnet yoke 4. For the disk holder 1, a relatively elastic material such as polyacetal resin is used.

When the magnet yoke 4 is inserted along the first projections 20 of the disk holder 1 and turned, the second projections 21 are bent downward momentarily because of their elasticity. However, the second projections 21 return to their original positions by the elasticity and engage into the notches (N) of the magnet yoke 4, when the notches (N) of the magnet yoke 4 come to the positions of the second projections 21. Accordingly, this prevents the magnet yoke 4 from turning and coming loose. This structure can thus obtain a stable retention without providing any addition of fixing members, thereby realizing a cost reduction of the disk retaining mechanism. Besides, a part of the second projections 21 may be formed vertically as shown in FIG. 6D, so as to avoid disengagement of the second projections 21 from the notches (N), even if the magnet yoke 4 slides up and down within the disk holder 1, thereby ensuring the reliable retention.

Second Exemplary Embodiment

Figure 7:
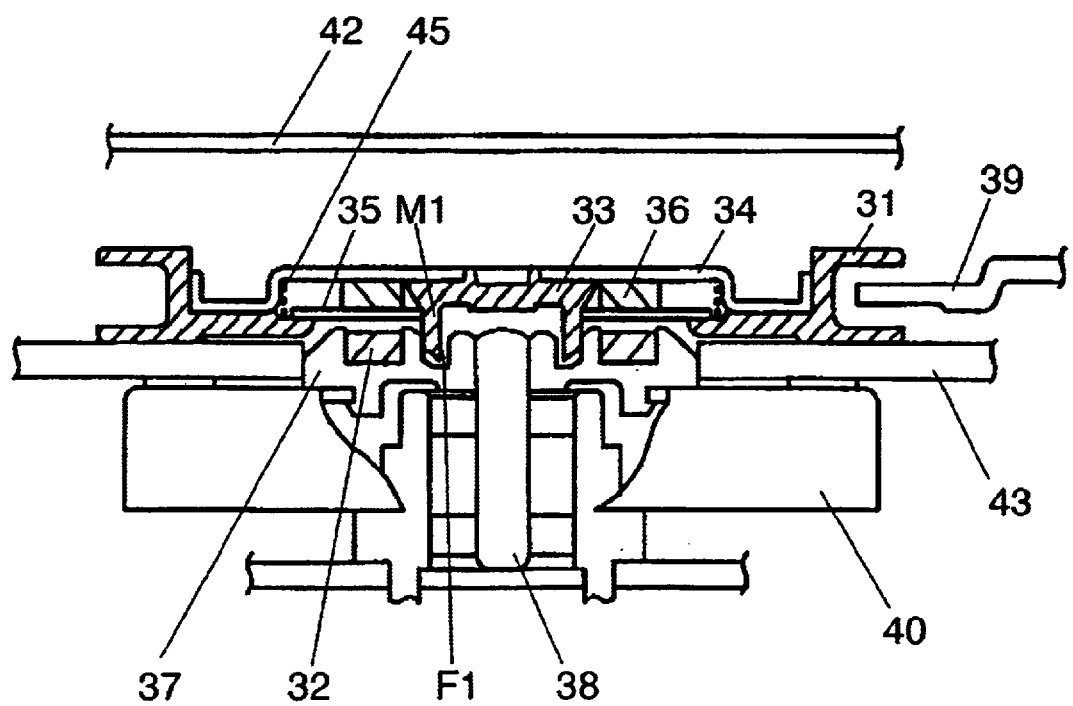
FIG. 7 is a sectional view depicting an essential part of another exemplary embodiment of the present invention.
Figure 8A:
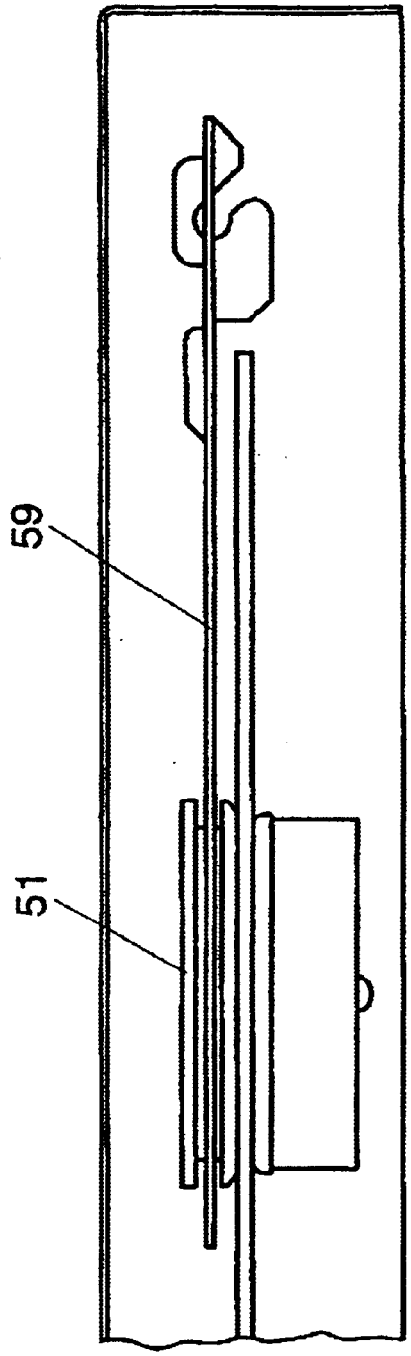
FIGS. 8A and B are side views depicting an essential part of a disk retaining mechanism of the prior art.
Figure 8B:
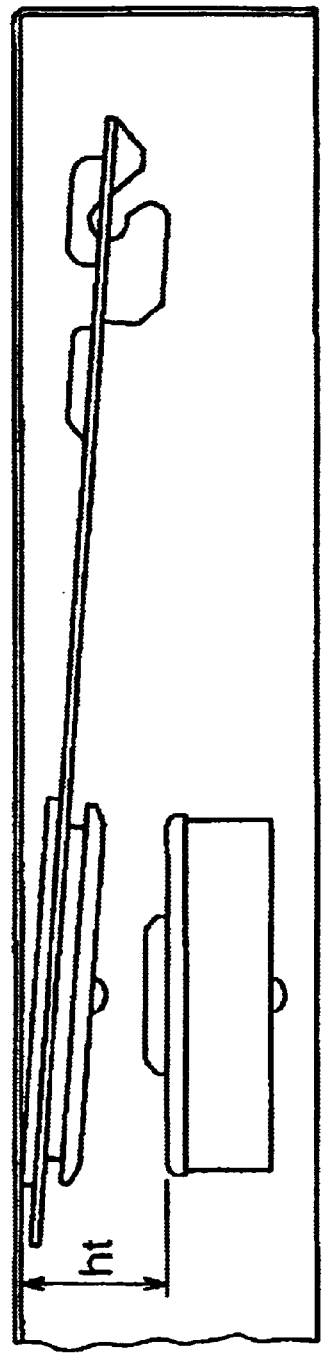
Figure 9:
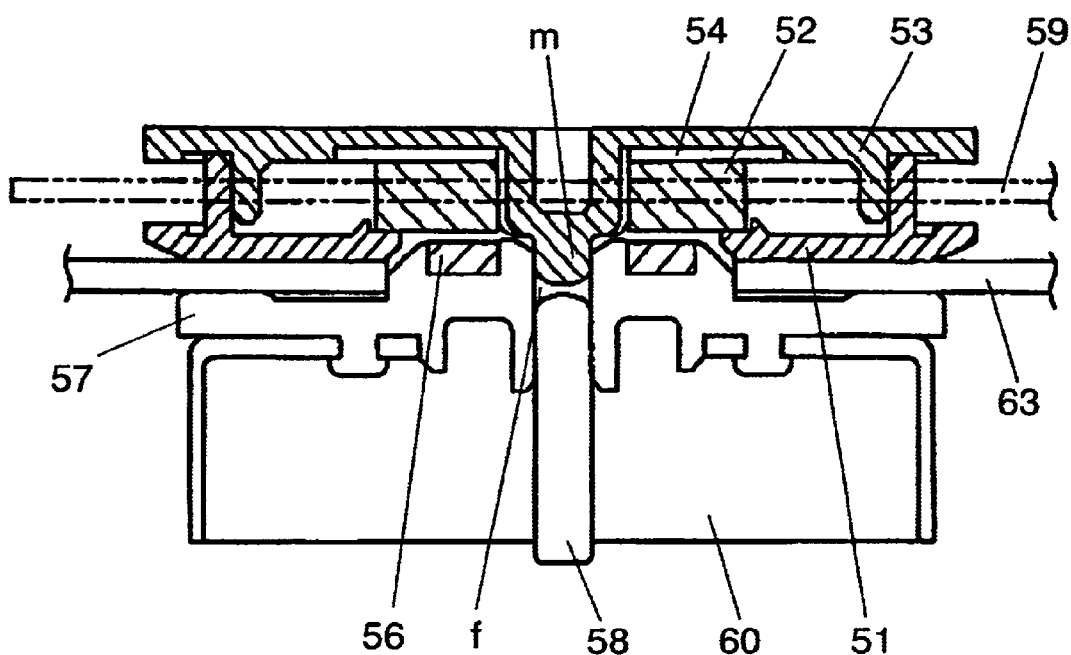
FIG. 9 is a sectional view depicting an essential part of the disk retaining mechanism of the prior art.
Figure 10:
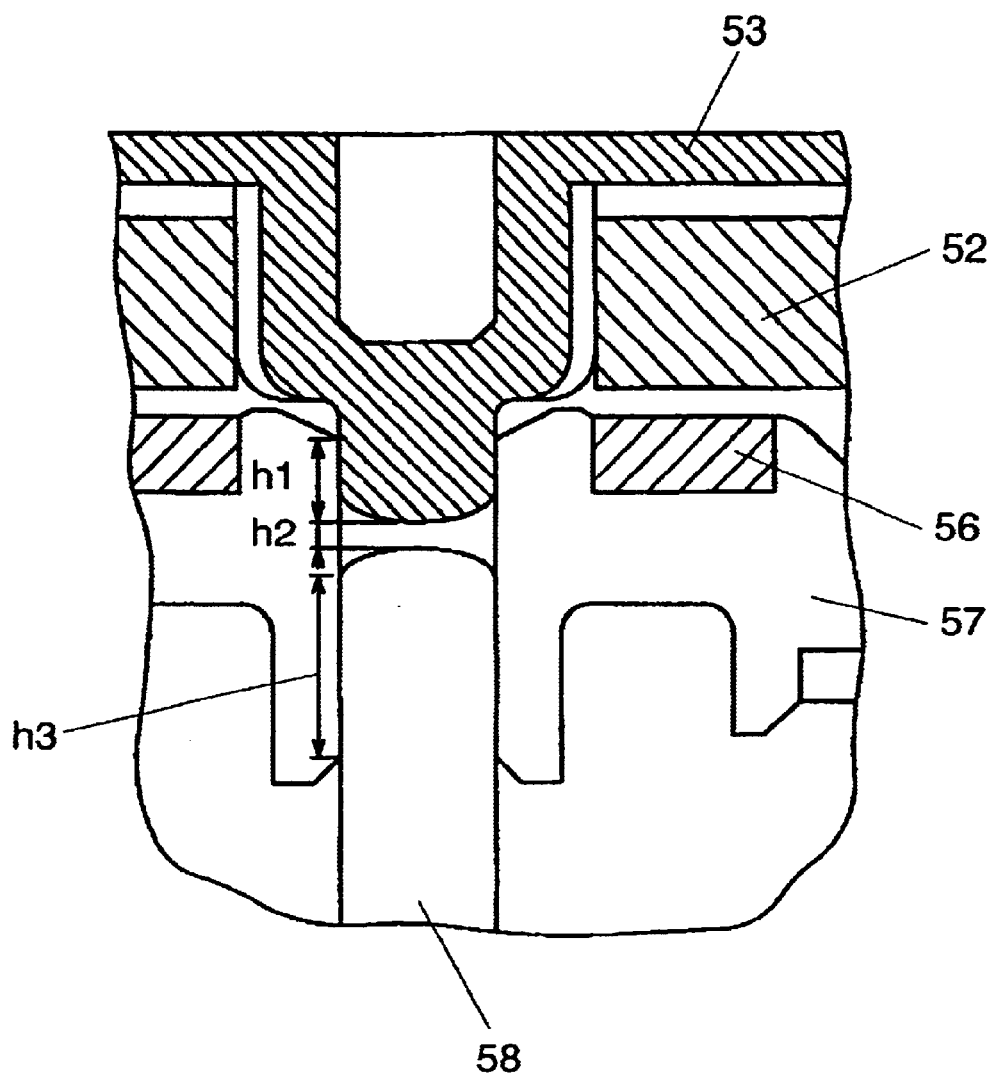
FIG. 10 is a sectional view depicting a main part of a centering engagement portion in the disk retaining mechanism of the prior art.

FIG. 7 is an illustration showing another embodiment of the present invention. FIG. 7 depicts a state in which a disk 43 is clamped. In this exemplary embodiment, a disk depressing member is comprised of a disk holder 31. A centering member comprises a disk holder 33, a clamper yoke 34, and another clamper yoke 36. The clamper yoke 36 formed of ferromagnetic material such as iron into an annular shape is disposed concentrically to the disk holder 33 and the clamper yoke 34. The disk holder 33 is provided with an engagement projection (M1). A leading end of the engagement projection (M1) is tapered. A clamper unit is retained totally by a clamper retaining member 39. A yoke cover 35 retains the clamper yoke 36. Further, a turntable 37 is connected with a main shaft 38, which transfers rotation of a motor unit 40. An engagement groove (F1) formed annularly in the turntable 37 is arranged below an upper end of the main shaft 38. A magnet 32 has an annular shape, and it is secured concentrically on the turntable 37 by adhesion or the like. The engagement groove (F1) may be formed at regular intervals along one circumference. Or, the engagement groove (F1) may be substituted by engagement holes formed at regular intervals along the same one circumference. The clamper yoke 36 and another clamper yoke 34 may be formed integrally. For example, it may be fabricated by press-forming sheet steel, i.e. ferromagnetic material.

When a disk 43 is inserted, an electric signal activates a driving circuit of the clamper retaining member 39. And, the clamper retaining member 39 thrusts the entire clamper unit toward the turntable 37. The disk holder 31 shifts vertically downward. The engagement projection (M1) of the disk holder 33 comes into contact to the engagement groove (F1) of the turntable 37, and the centering begins when their tapered portions contact with each other. The disk holder 31 is thrust further toward the turntable 37 to advance the engagement accurately by an attractive force of the magnetic circuit formed between the magnet 32 and the clamper yoke 36. Accordingly, the disk 43 is also centered at the same time, and it is subsequently fixed in position between the turntable 37 and the disk holder 31. In this invention, the centering is achieved by engaging an outer periphery of the engagement projection (M1) of the disk holder 33 with an outer periphery of the engagement groove (F1) of the turntable 37. This can attain precise clamper centering with a small deviation, since an engaging diameter for the centering is very large. In this exemplary embodiment of the invention, the engagement groove (F1) in the turntable 37 is arranged below the upper end of the main shaft 38 for transferring rotation of the motor unit 40 to the turntable 37, so as to realize a reduction in thickness of the disk retaining mechanism while maintaining the necessary engagement length.

The clamper yoke 34 disposed concentrically within the disk holder 31 is vertically slidable. A spring 45 defining a resilient member is disposed between the disk holder 31 and the clamper yoke 34. A thrusting force produced by the spring 45 is arranged to be smaller than the attractive force of the magnetic circuit formed between the magnet 32 and the clamper yoke 36. When the entire clamper unit is thrust by the clamper retaining member 39 toward a back-out position, the disk holder 31 comes into contact with the cover 42 and stays generally in parallel therewith. Furthermore, the disk holder 33 and the clamper yoke 34 are shifted upwardly by the thrusting force of the spring 45. Accordingly, the clamper yoke 34 moves up until it comes into contact with the cover 42, and this can further reduce the thickness of the entire clamper unit. In other words, this structure of the invention can reduce not only a height of the clamper unit itself but also a back-out height necessary for backing out the clamper unit. The resilient member may be of any resilient material such as rubber, resin or the like. Also, an equivalent function can be provided if a magnet is placed on a portion of the cover 42, by using an attractive force produced by a magnetic circuit formed between the magnet and the clamper yoke 36 or the clamper yoke 34.

INDUSTRIAL APPLICABILITY

As described above the present invention realizes a low-profile disk retaining mechanism that ensures a proper clamping force and good centering accuracy of the clamper at all times.

List of Reference Numerals

1. Disk holder A
2. Magnet
3. Disk holder B
4. Magnet yoke
5. Magnet cover
6. Turntable yoke
7. Turntable
8. Main shaft
9. Clamper retaining member (Clamper unit retaining member)
10. Motor unit
11. Guide
12. Cover
13. Disk
15. Spring
20. First projection
21. Second projection
F. Engagement groove
G. Groove
M. Engagement projection
N. Notch in magnet yoke

What is claimed is:

1. A disk retaining mechanism comprising:
a turntable unit for loading a disk thereon;
a motor unit for transferring rotation to said turntable unit;
a clamper unit for holding said disk with said turntable unit;
a clamper unit retaining member for retaining said clamper unit, clamper unit retaining member having a generally semi-circular shaped clamper unit retaining portion; and
a guide unit disposed in a position confronting said clamper unit retaining member and in close vicinity of a disk holder, wherein said guide unit guides said disk holder when said disk holder makes a reciprocating motion between a back-out position and a disk clamping position and serves to prevent the disk holder from coming off said clamper unit retaining member.

2. A disk retaining mechanism according to claim 1, wherein:
said clamper unit comprises a disk depressing member for depressing a disk and a centering member projecting downwardly from said disk depressing member and disposed at about the center of said disk depressing member;
said turntable unit has a groove for engaging with said centering member; and
said motor unit has a main shaft engaged with said turnable unit:
wherein a magnet is disposed on one of said disk depressing member and said turntable unit, and a ferromagnetic body is disposed on the other one in a position confronting said magnet, thereby attracting said disk depressing member to said turntable unit by an attractive force of said magnet.

3. The disk retaining mechanism according to claim 2, wherein:
said magnet is disposed within said disk depressing member;
said ferromagnetic body is disposed on said turntable unit;
said groove is formed in an annular shape or at regular intervals along one circumference; and
said groove is arranged below an upper end of said main shaft, thereby
thrusting said centering member toward said turntable unit side by an attractive force of said magnet, and engaging an outer periphery of said centering member with an outer periphery of said groove, to carry out centering.

4. The disk retaining mechanism according to claim 2, wherein:
said ferromagnetic body is disposed within said disk depressing member to constitute a clamper yoke;
said magnet is disposed annularly on said turntable unit;
said groove is formed in an annular shape or at regular intervals along one circumference; and
said groove is arranged below an upper end of said main shaft of said motor unit, thereby thrusting said centering member toward said turntable unit side by an attractive force of said magnet, and engaging an outer periphery of said centering member with an outside periphery of said groove, to carry out centering.

5. The disk retaining mechanism according to claim 2, wherein:
said ferromagnetic body is disposed within said disk depressing member to constitute a clamper yoke;
said clamper yoke is vertically slidable with respect to said disk depressing member, and it is disposed concentrically to said depressing member;
said magnet is disposed annularly on said turntable unit;
said groove is formed in an annular shape or at regular intervals along one circumference; and
a resilient member having a resilient force is disposed between said clamper yoke and said disk depressing member, the resilient force being generally smaller than an attractive force of magnetism between said magnet on said turntable unit and said clamper yoke.

6. A disk retaining mechanism according to claim 1 wherein:
said clamper unit comprises a disk depressing member for depressing a disk and a centering member projecting downwardly from said disk depressing member and disposed at about the center of said disk depressing member;
said turntable unit has a hole for engaging with said centering member; and
said motor unit has a main shaft engaged with said turntable unit:

wherein
a magnet is disposed on one of said disk depressing member and said turntable unit, and a ferromagnetic body is disposed on the other one in a position confronting said magnet, thereby attracting said disk depressing member to said turntable unit by an attractive force of said magnet.

7. The disk retaining mechanism according to claim 6, wherein:
said magnet is disposed within said disk depressing member;
said ferromagnetic body is disposed on said turntable unit;
said hole is formed at regular intervals along one circumference; and
said hole is arranged below an upper end of said main shaft, thereby thrusting said centering member toward said turntable unit side by an attractive force of said magnet, and engaging an outer periphery of said centering member with an outer periphery of said hole, to carry out centering.

8. The disk retaining mechanism according to claim 6, wherein:
said ferromagnetic body is disposed within said disk depressing member to constitute a clamper yoke;
said magnet is disposed annularly on said turntable unit;
said hole is formed at regular intervals along one circumference; and
said hole is arranged below an upper end of said main shaft, thereby thrusting said centering member toward said turntable unit side by an attractive force of said magnet, and engaging an outer periphery of said centering member with an outside periphery of said hole, to carry out centering.

9. The disk retaining mechanism according to claim 6, wherein:
said ferromagnetic body is disposed within said disk depressing member to constitute a clamper yoke;
said clamper yoke is vertically slidable with respect to said disk depressing member, and it is disposed concentrically to said depressing member;
said magnet is disposed annularly on said turntable unit;
said hole is formed at regular intervals along one circumference; and
a resilient member having a resilient force is disposed between said clamper yoke and said disk depressing member, the resilient force being generally smaller than an attractive force of magnetism between said magnet on said turntable unit and said clamper yoke.

10. The disk retaining mechanism according to claim 1, 2, 3, 6 or 7 further having a cover unit disposed on said clamper unit at a side opposite said turntable unit for covering at least a portion of said clamper unit, at least a part of said cover unit consisting of ferromagnetic material.

11. The disk retaining mechanism according to claim 2, further having a cover unit disposed on said clamper unit at a side opposite said turntable unit for covering at least a portion of said clamper unit, at least a part of said cover unit consisting of ferromagnetic material.

12. The disk retaining mechanism according to claim 3, further having a cover unit disposed on said clamper unit at a side opposite said turntable unit for covering at least a portion of said clamper unit, at least a part of said cover unit consisting of ferromagnetic material.

13. The disk retaining mechanism according to claim 6, further having a cover unit disposed on said clamper unit at a side opposite said turntable unit for covering at least a portion of said clamper unit, at least a part of said cover unit consisting of ferromagnetic material.

14. The disk retaining mechanism according to claim 7, further having a cover unit disposed on said clamper unit at a side opposite said turntable unit for covering at least a portion of said clamper unit, at least a part of said cover unit consisting of ferromagnetic material.

15. A clamper of a disk retaining mechanism comprising:
a turntable unit for loading a disk thereon;
a motor unit for transferring rotation to said turntable unit; and
a clamper unit for holding and retaining said disk with said turntable unit, said clamper unit comprising:
a disk depressing member for depressing said disk;
a sheet member of non-magnetic material or weak magnetic material disposed within said disk depressing member and on said magnet at one side closer to said turntable unit, wherein said magnet is disposed on said sheet member; and
a centering member disposed at the about center of said disk depressing member,
wherein said disk depressing member is attracted to said turntable unit by an attractive force of said magnet, and thereby said centering member is thrust toward said turntable unit side.

16. The clamper according to claim 15, wherein said centering member is disposed within said disk depressing member in concentric with said disk depressing member, thereby maintaining said centering member vertically slidable with respect to said disk depressing member.

17. The clamper according to claims 15 or 16 further having a cover unit disposed on said clamper unit at a side opposite said turntable unit for covering at least a portion of said clamper unit, at least a part of said cover unit consisting of ferromagnetic material.

18. The clamper according to claim 15, wherein a resilient member is disposed between said centering member and said disk depressing member.

19. The clamper according to claim 16 further having a cover unit disposed on said clamper unit at a side opposite said turntable unit for covering at least a portion of said clamper unit, at least a part of said cover unit consisting of ferromagnetic material.

20. A clamper of a disk retaining mechanism having:
a turntable unit for loading a disk thereon;
a motor unit for transferring rotation to said turntable unit; and
a clamper unit for holding and retaining said disk with said turntable unit, said clamper unit comprising:
a disk depressing member for depressing said disk; and
a centering member disposed within said disk depressing member, wherein
said centering member is engaged within said disk depressing member in concentric with said disk depressing member in a vertically slidable manner,
said disk depressing member is provided with at least one pair of a first projection and a second projection in a hole thereof for engagement with said centering member, and the second projection is located below the first projection at regular intervals,
said centering member has at least one notch similar in shape to said first projection, and thereby
said centering member is retained by said second projection of said disk depressing member when said centering member is turned while being depressed.

* * * * *